United States Patent [19]

Reagan

[11] Patent Number: 5,820,129

[45] Date of Patent: Oct. 13, 1998

[54] MECHANICAL SPLIT DOUBLE SEALS

[75] Inventor: Michael P. Reagan, Greenwell Springs, La.

[73] Assignee: Power Packing Co., Inc., Baton Rouge, La.

[21] Appl. No.: 774,202

[22] Filed: Dec. 27, 1996

Related U.S. Application Data

[63] Continuation-in-part of Ser. No. 680,219, Jul. 11, 1996, abandoned.

[51] Int. Cl.[6] ............................................. F16J 15/34
[52] U.S. Cl. ........................... 277/1; 277/27; 277/65; 277/81 S
[58] Field of Search ........................ 277/1, 65, 81 S, 277/27, 59, 96.1, 198

[56] References Cited

U.S. PATENT DOCUMENTS

| | | | |
|---|---|---|---|
| 2,996,319 | 8/1961 | Copes | 286/11.15 |
| 3,101,200 | 8/1963 | Tracy | 277/93 |
| 4,101,139 | 7/1978 | Nordin | 277/22 |
| 4,268,232 | 5/1981 | Haupt | 418/135 |
| 4,299,398 | 11/1981 | Wahl | 277/65 |
| 4,576,384 | 3/1986 | Azibert | 277/81 S |
| 4,900,039 | 2/1990 | Klecker et al. | 277/27 |
| 5,261,676 | 11/1993 | Rockwood | 277/42 |
| 5,375,853 | 12/1994 | Wasser et al. | 277/59 |
| 5,531,456 | 7/1996 | Riel | 277/38 |
| 5,553,867 | 9/1996 | Rockwood | 277/15 |

FOREIGN PATENT DOCUMENTS

| | | |
|---|---|---|
| 917693 | 2/1963 | United Kingdom . |

OTHER PUBLICATIONS

PPC Mechanical Seals, New, Unique 1200S Split Seal, Brochure, undated.

PPC Mechanical Seals, The Industry's Premier Double/Tandem Cartridge Seal Power Pumper With Exclusive Power Flow Pumping Ring Brochure, undated.

Power Packing Company Mechanical Seals, UltraSeal 2000 Environmentally Safe Double/Tandem Metal Bellows Cartridge Seal Brochure, undated.

PPC Mechanical Seals, Pulp Master Cartridge Seal, Uniquely Designed for the Pulp and Paper Industry, Brochure, undated.

*Primary Examiner*—Daniel G. DePumpo
*Attorney, Agent, or Firm*—John F. Sieberth; R. Andrew Patty, II

[57] ABSTRACT

Split mechanical seal assemblies which include a pressurized fluid barrier and multiple concentric and axially aligned stationary seal rings. The stationary seal rings are in sealing relation with a rotary seal ring at their respective seal faces, and with the gland of the mechanical seal assembly, thereby forming an annular cavity for pressurized fluid to create a positive fluid pressure barrier across the seal faces when in sealing contact with each other. The axially and concentrically aligned stationary seal rings comprise an inner stationary seal ring and an outer stationary seal ring, and the area of the axially extending portion of the outer surface of the outer seal ring partially defining the annular cavity is greater than the area of the axially extending portion of the inner surface of the outer seal ring partially defining the annular cavity. The split configuration of the seal assembly facilitates quick installation, removal and maintenance of the seal assembly and its component parts. The seal assembly is also compact in design on account of the concentric and axially aligned stationary seal rings, permitting installation and maintenance of the assembly and its component parts under circumstances where space is limited. These benefits are provided without sacrificing the function benefits of a pressurized fluid pressure barrier as a supplement to the seal between the stationary and rotary seal rings.

35 Claims, 3 Drawing Sheets

MECHANICAL SPLIT DOUBLE SEALS

REFERENCE TO RELATED APPLICATION

This application is a continuation-in-part of U.S. patent application Ser. No. 08/680,219, filed on Jul. 11, 1996 now abandoned.

TECHNICAL FIELD

This invention relates to split mechanical seals and their use.

BACKGROUND

Mechanical seals are designed for use on a wide variety of machines having rotating shafts that pass through housings, such as pumps, agitators, blenders, separators, refiners, dryers, mixers and other objects. The function of the mechanical seal is to prevent leakage of pressurized fluid materials where the shaft passes through the housing. In the mechanical seals to which this invention relates— sometimes referred to as a rotary face seal—sealing is achieved by arranging at least two durable sealing rings having extremely flat radially extending sealing faces axially adjacent to each other and concentrically disposed about the shaft so that the faces are in sealing contact. One or more rings are held stationary in the seal gland while one or more other rings rotate with the shaft as part of a unit sometimes termed a rotary.

Repair or replacement of parts of such seals is difficult whenever inaccessibility of the outboard end of the shaft or the location of the machine make it impossible to slip the seal off the end of the shaft. In such situations, the machines themselves must be disassembled. To facilitate such repair or replacement of parts, use has been made of radially split seal assemblies so that the gland, the rotary, and each ring may be removed from the shaft, and new rings may be reassembled within the seal and about the shaft. Mechanical seals of various designs utilizing split sealing rings are disclosed, for example, in U.S. Pat. Nos. 2,996,319; 3,101,200; 4,576,384; and G.B. 917,693. In addition, mechanical seals employing such split ring technology are available as articles of commerce from a number of manufacturers.

Pressurized fluid has been employed to supplement double mechanical seals when the material being sealed has particles or other debris suspended therein. In a typical configuration, the pressurized fluid is injected into an area between the seals to create a positive fluid pressure barrier between the seals and the subject material. In this way, the particles or other debris are forced away from the seal ring faces which are in sealing contact with and are rotating relative to one another. In the absence of such a pressurized fluid barrier, such particles can corrupt the seal between the seal rings, thereby resulting in damage to the seal rings and seal leakage. Known mechanical seals employing such pressurized fluid use unitary, as opposed to split, configurations. These known mechanical seals often assume significant amounts of space axially along the rotary shaft and can prove difficult to install and maintain because of their unitary configuration. Thus, a need exists for a compact, efficient mechanical seal which provides the additional benefits of a pressurized fluid barrier, while at the same time is easy to install and maintain.

SUMMARY OF THE INVENTION

The present invention is deemed to fulfill this need by providing a novel mechanical seal assembly split into at least two assembly sections and constructed such that, when assembled, an annular sealed cavity is formed within the assembly to contain pressurized fluid, thereby creating a positive fluid pressure barrier across seal faces within the seal assembly. Thus, the seal assembly of this invention comprises:

a) at least two split, axially and concentrically aligned stationary seal rings, each having a stationary seal face, an inner surface, and an outer surface;

b) a split rotary seal ring rotatable relative to the stationary seal rings and having a rotary seal face;

c) a split seal housing encasing the seal rings; and d) split elastomeric means between the housing and the outer surfaces, and seal means between the assembly sections, whereby a sealed annular cavity is formed by the housing and the seal rings;

the housing being adapted to admit pressurized fluid into the cavity to create a positive fluid pressure barrier across the seal faces when in sealing contact with each other. The axially and concentrically aligned stationary seal rings comprise an inner stationary seal ring and an outer stationary seal ring, and the area of the axially extending portion of the outer surface of the outer seal ring partially defining the annular cavity is greater than the area of the axially extending portion of the inner surface of the outer seal ring partially defining the annular cavity. In this way, fluid pressure within the annular cavity and along the outer surface of the outer seal ring urges the outer seal ring sections together to provide the combined features of split rings and a highly efficient seal.

In preferred embodiments of this invention, the seal assembly is split substantially diametrically into a pair of assembly sections. It is also preferred that the elastomeric means comprises at least two O-rings, at least one of which is annularly disposed around one of the stationary seal rings and at least one of which is annularly disposed around another of the stationary seal rings. The seal means preferably comprises a plurality of gaskets sealing the split housing when the assembly sections are urged together.

It is also particularly preferred that the outer stationary seal ring be divided into at least two outer stationary seal ring segments, each segment further comprising:

a) two sealing end surfaces, each sealing end surface being co-engageable with a sealing end surface of another ring segment to form an interface between that pair of sealing end surfaces, the outer surface of the outer stationary seal ring forming a radially extending recess traversing the interface, the recess defined in part by a pair of spaced-apart parallel radially extended interior wall faces; and b) an aligning clip projecting from one of each pair of sealing end surfaces and disposed between and engaging the interior wall faces of the recess on one side of the interface and extendable into the recess on the other side of the interface to maintain the sealing end surfaces in detachable co-engagement and alignment with each other.

These aligning clips serve to insure proper alignment of the outer stationary seal ring segments when the seal assembly is installed, thereby insuring substantially leak-free performance by the outer seal ring.

This invention also provides a method of sealing the annular space between an object and a rotatable shaft extending through an aperture in said object. The method comprises sealably attaching to the object and around the shaft a mechanical seal assembly of this invention.

These and other embodiments and features of the invention will become still further apparent from the ensuing description, accompanying drawings and appended claims.

BRIEF DESCRIPTION OF THE DRAWINGS

In the Figures, like numerals and reference characters represent like parts among the different Figures.

FURTHER DETAILED DESCRIPTION

As stated above, the seal assembly of this invention provides a unique and beneficial combination of features in a compact split seal which is easy to install and maintain on account of its split configuration and concentric and axially aligned stationary seal rings.

Figure 1:
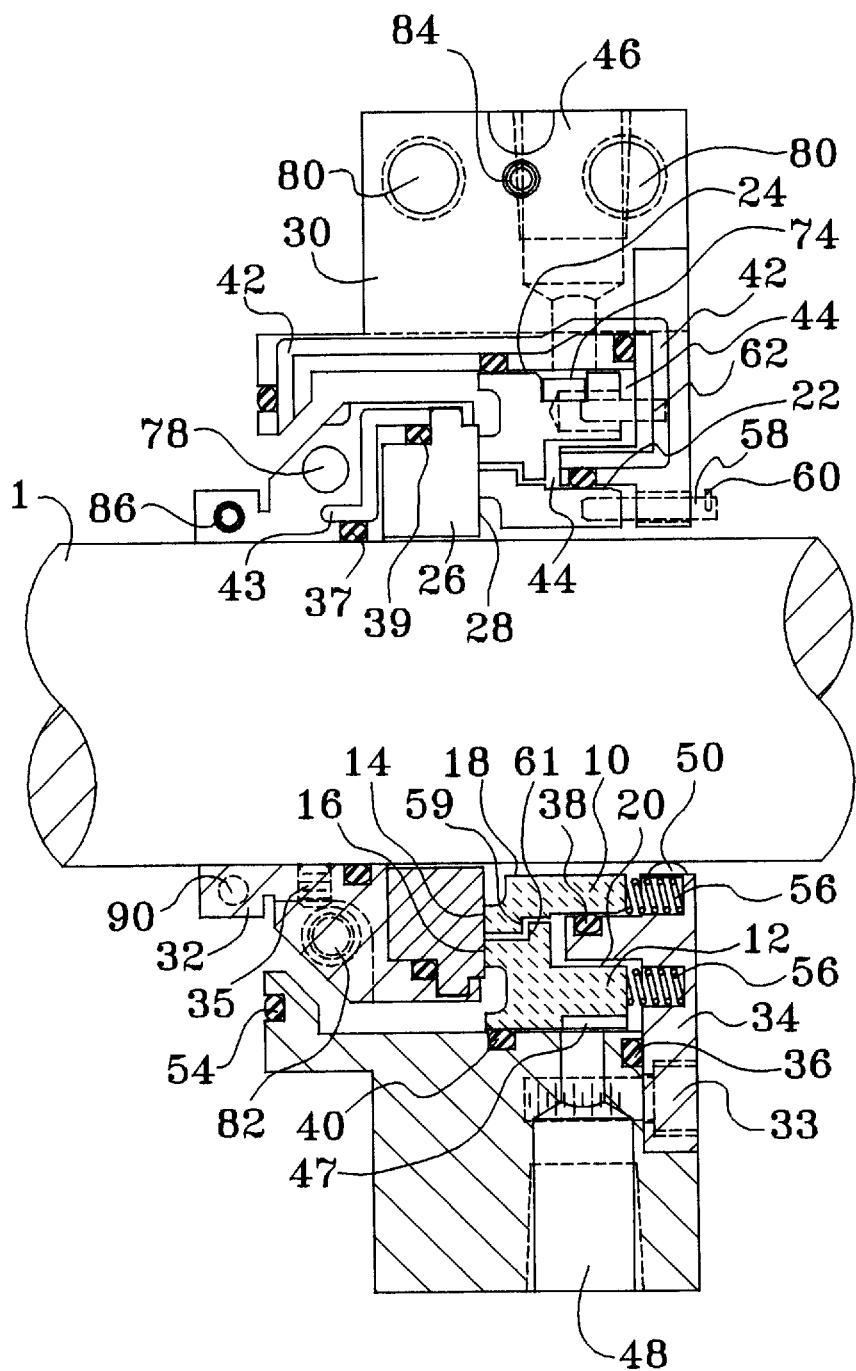
FIG. 1 depicts in section (except for the rotary shaft) a preferred seal assembly of this invention, partially in phantom view, in which the upper part is taken in one axial plane and the lower part in a different axial plane.
Figure 2:
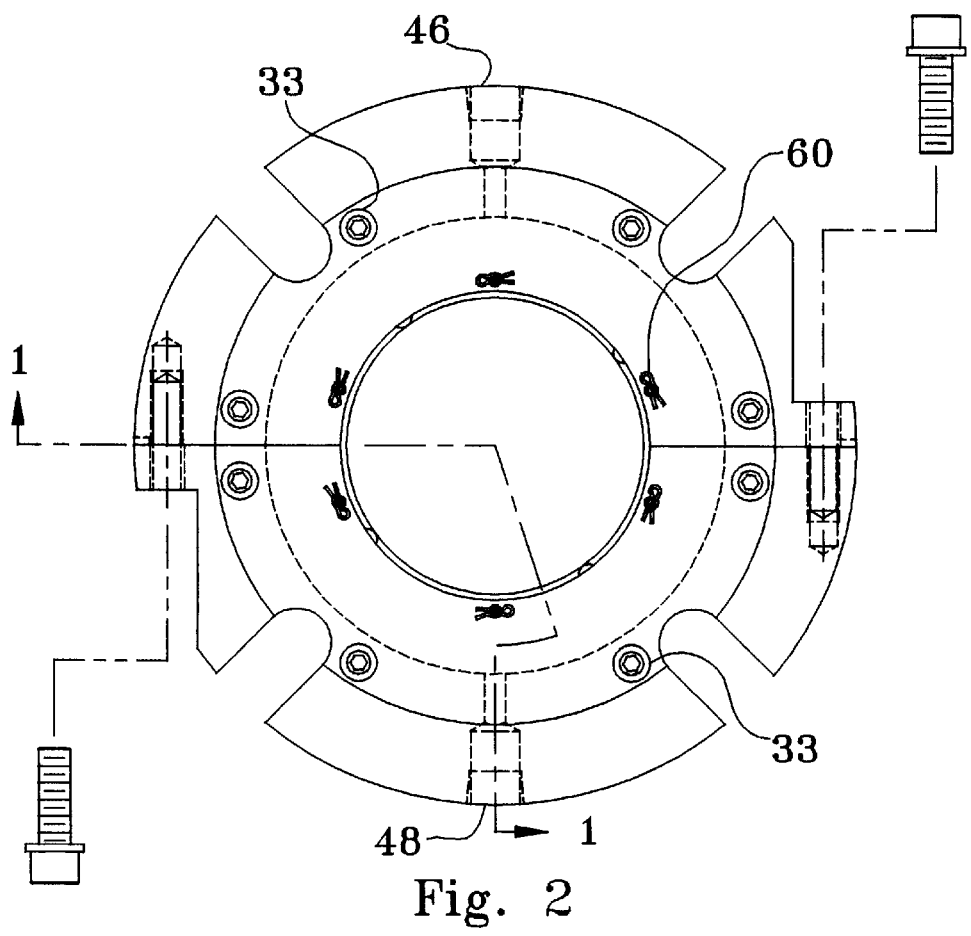
FIG. 2 is a plan view of the seal assembly of FIG. 1, partially in phantom view, illustrating the cross-section line of FIG. 1.
Figure 3:
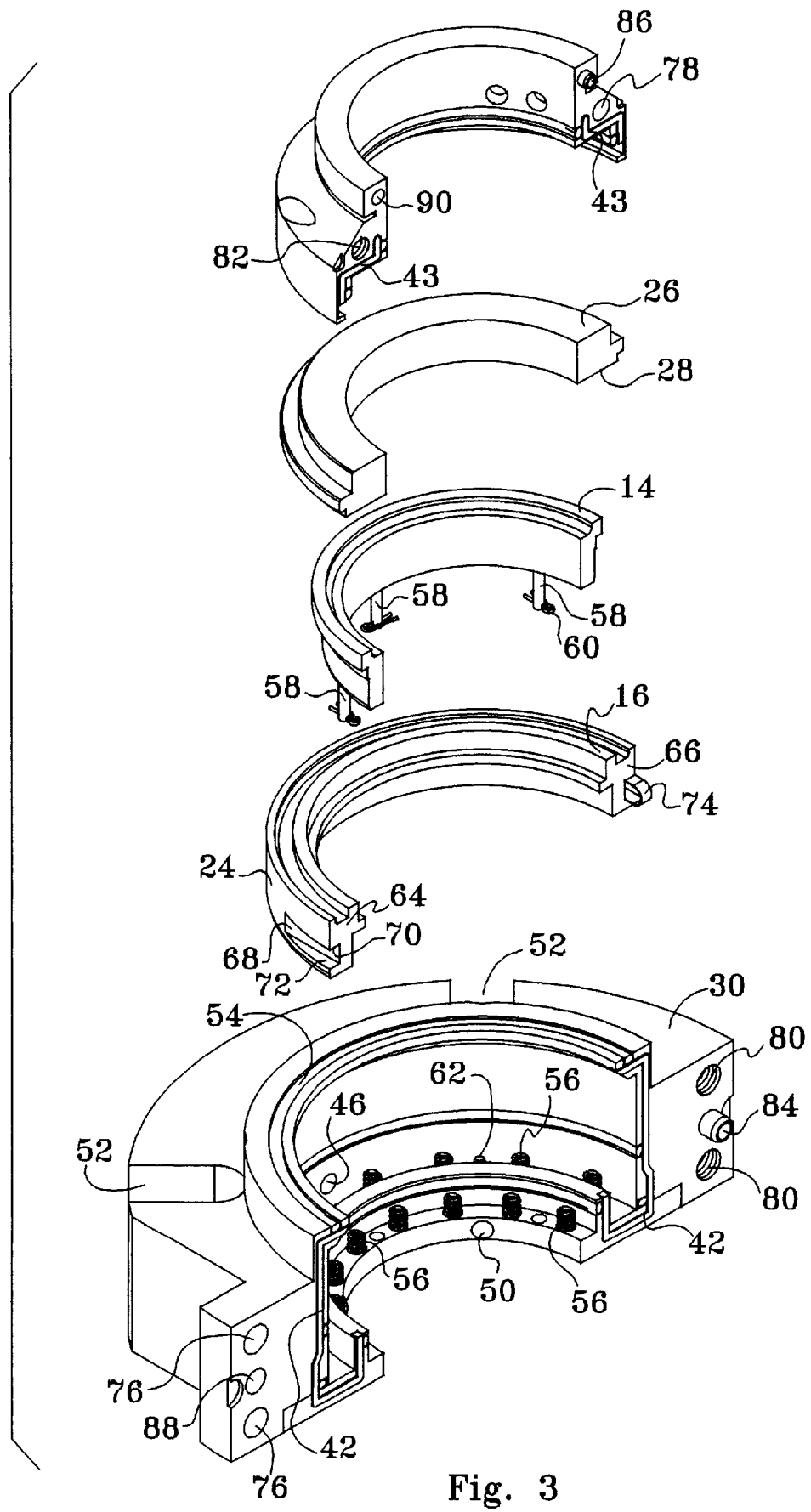
FIG. 3 is a partially exploded, perspective view of the device of FIG. 1.

Referring now to the drawings, FIG. 1 illustrates one section of a split seal assembly of this invention. The particular section illustrated in FIG. 1 is identified in FIG. 2. The seal assembly section depicted is part of a seal assembly which is split substantially diametrically, thus giving this illustration of the assembly section the appearance of a cross-section of the seal assembly. FIG. 3 depicts the same seal assembly section in an exploded perspective view. As can be seen from FIG. 1, when assembled, the split seal assembly surrounds a rotary shaft 1 which extends through an object (not depicted). The seal assembly comprises a split inner stationary seal ring 10 and a split outer stationary seal ring 12 which are axially and concentrically aligned with one another, and which have respective stationary seal faces 14 and 16, inner surfaces 18 and 20, and outer surfaces 22 and 24. A split rotary seal ring 26 is rotatable relative to rings 10 and 12, ring 26 having a rotary seal face 28. A split seal housing, comprised of a split gland 30 and a split rotary 32, substantially encases seal rings 10, 12 and 26. Although not required, gland 30 of the preferred embodiment depicted includes a split spring holder 34 and a split O-ring 36, spring holder 34 partially extending between seal rings 10 and 12 and being detachably attached to the rest of gland 30 by a plurality of annularly disposed bolts 33.

As may be seen in FIG. 1, rotary 32 is substantially surrounded by gland 30, is detachably attached to rotary shaft 1 by a plurality of set screws 35 (only one depicted), and is placed in sealing relation with rotary shaft 1 by a split O-ring 37. Split elastomeric means in the form of split O-rings 38 and 40 are disposed between gland 30 and said outer surfaces 22 and 24, respectively, and seal means in the form of two gaskets 42 (only one depicted in FIG. 1) and two gaskets 43 (only one depicted in FIG. 1) are disposed between the junctures of the gland portion and the rotary portion, respectively, of the assembly sections. A seal is maintained between rotary 32 and seal ring 26 by a split O-ring 39. When the seal assembly has been installed, a sealed annular cavity 44 is formed by gland 30, seal rings 10, 12, and 26, gaskets 42, and O-rings 36, 38 and 40.

Pressurized fluid may be introduced into cavity 44 through gland 30 via an inlet aperture 46, to thereby create a positive fluid pressure barrier across the seal faces when in sealing contact with each other. It should be understood that aperture 46 as depicted with phantom lines in FIG. 1 has been rotated around the rotary shaft for purposes of illustration only. Gland 30 further includes an outlet aperture 48, which permits circulation of fresh pressurized fluid into cavity 44, thereby serving to transfer heat generated at points of friction away from the seal assembly during operation. As can be seen from FIG. 2, apertures 46 and 48 in the preferred embodiment depicted are in fact substantially diametrically opposite one another. In addition, outer stationary seal ring 12 includes two notches 47 (only one depicted on FIG. 1) in its outer surface 24 adjacent to apertures 46 and 48 to facilitate the flow of fluid into and/or out of these apertures. While apertures 46 and 48 have been identified here as inlet and outlet apertures, respectively, they may alternatively switch roles to serve as outlet and inlet apertures, respectively. A plurality of spacers 50 are also attached to gland 30, preferably at substantially equi-distance from one another, and extending toward rotary shaft 1, to thereby maintain the seal assembly in substantially concentric alignment with shaft 1 during installation. As can be seen in FIG. 3, gland 30 has a plurality of notches 52 at its perimeter for receiving attachment means (e.g., bolts, screws), for attaching the seal assembly to the object through which rotary shaft 1 extends. An O-ring 54 is also provide to create a seal between gland 30 and the object to which the seal assembly is attached.

Seal faces 14 and 16 are maintained in sealing relation with seal face 28 by biasing means in the form a plurality of compression springs 56 disposed between spring holder 34 and either seal ring 10 or 12. A group of compression springs is provided for each stationary seal ring, and within each group, the springs are annularly displaced at substantially equi-distance from one another so as to provide substantially even axial biasing force against their respective stationary seal ring. Inner stationary seal ring 10 is retained to prevent rotation with rotary seal ring 26 under operating conditions by a plurality of pins 58 which are affixed to ring 10, extend through spring holder 34, and are held in place by clips 60. Outer stationary seal ring 12 is similarly retained to prevent rotation by a plurality of pins 62 which are affixed to spring holder 34 and extend into ring 12. Inner ring 10, pins 58, and clips 60 also act to hold outer ring 12 in place through a step 59 along outer surface 22 of inner ring 10 which is configured to meet and abut a step 61 along inner surface 20. Clips 60 act to hold rings 10 and 12 in place until the seal is installed.

Figure 4:
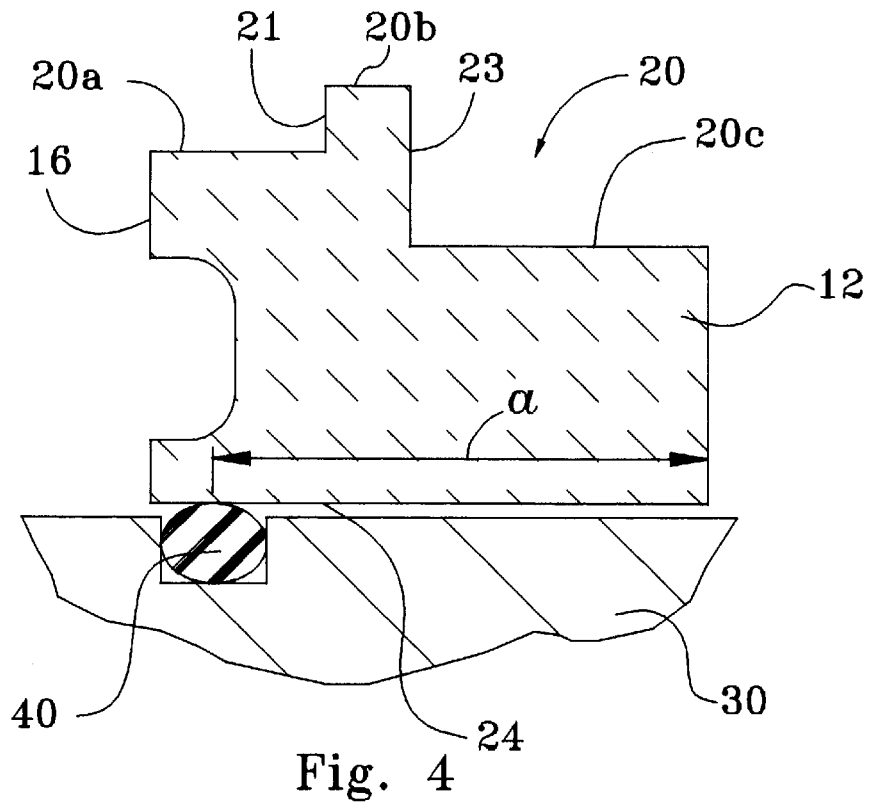
FIG. 4 depicts in section the outer stationary seal ring when in sealing relation with the housing of a preferred seal assembly of this invention, partially broken away.

As previously noted, in preferred embodiments, the area of the axially extending portion of outer surface 24 which partially defines cavity 44 is greater than the area of the axially extending portion of inner surface 20 which partially defines cavity 44. Thus, as may be seen in FIG. 4, inner surface 20 further includes inner surface portions 20a, 20b, 20c, 21 and 23. The area of outer surface 24 which extends the length of α and partially defines cavity 44 should be greater than the area of portions 20a, 20b, and 20c of inner surface 20. The length α is defined as the distance from the end of outer ring 12 opposite seal face 16 to the initial point of sealing contact between O-ring 40 and outer surface 24. In most if not all cases, this point of initial sealing contact will be at or to the right of the center line of O-ring 40, as depicted in FIG. 4. Inner surface portions 21 and 23 are not considered in this calculation, since force applied to these portions by fluid pressure does not substantially affect the radial position of the sections of outer ring 12. This preferred embodiment provides a way for fluid pressure within cavity 44 to positively act against outer surface 24 to urge the sections of outer seal ring 12 together, thereby providing a very efficient seal.

It will be understood that, in the device of this invention, outer seal ring 12 is divided into at least two outer stationary seal ring segments, only one of which is depicted in FIGS. 1 and 3. As depicted in FIG. 3, each outer stationary sealing ring segment in preferred embodiments comprises two sealing end surfaces 64, and 66, each sealing end surface being co-engageable with a sealing end surface of another segment (not shown) to form an interface between that pair of sealing end surfaces, outer surface 24 forming a radially extending recess 68 traversing the interface. Recess 68 is defined in part by a pair of spaced-apart parallel radially extended interior wall faces 70 and 72. An aligning clip 74 projects from one of each pair of said sealing end surfaces and is disposed between and engages interior wall faces 70 and 72 of recess 68 on one side of the interface to be extendable into recess 68 on the other side of the interface, thereby maintaining sealing end surfaces 64 and 66 in detachable co-engagement with the respective sealing end surfaces of the other segment. These aligning clips are described in greater detail in Applicant's copending patent application Ser. No. 08/585,925, filed on Jan. 16, 1996, now U.S. Pat. No. 5,615,893 the disclosure of which is incorporated herein by reference.

It may be seen from FIGS. 1 and 3 that both gland 30 and rotary 32 have a plurality of apertures 76 and 78, respectively, and a plurality of threaded holes 80 and 82, respectively, for receiving attachment means, such as bolts or screw, for attaching the rotary sections together and the gland sections together during assembly. Two bushings 84 and 86 are also provided on gland 30 and rotary 32, respectively, to be received by counterparts to apertures 88 and 90, respectively, to properly align the gland sections and the rotary sections during installation of the seal assembly.

The gland and rotary components of the housing of this invention may be fabricated from a variety of materials, including stainless steel, brass, other metal alloys and resilient plastics. Preferred materials include 316 stainless steel for the gland and the rotary. The biasing means typically used in the practice of this invention will be a plurality of compression springs retained so as to have an axis which is parallel to the rotary shaft axis, although a variety of alternative biasing means may be employed, including, for example, canted coils, wave springs, leaf springs, and bands of resilient copolymers. Again, when compression springs are used, the springs may be fabricated from an number of resilient materials, with Hastelloy® C-276 being particularly preferred for its corrosion-resistant properties. The elastomeric means employed in the device may be O-rings, box strips, or other suitable elastomeric materials which can provide a seal. However, conventional O-rings fabricated with standard rubber compositions are preferred. The seal means employed in the device may be elastomeric gaskets, silicon strips, plastic, or any other suitable resilient materials which can provide a seal at the splits in the seal assembly housing. Again, conventional elastomeric gaskets fabricated with standard rubber compositions are preferred. The retainer pins, screws and bolts utilized in preferred embodiments also may be fabricated from a variety of materials, including stainless steel, brass, other metal alloys and resilient plastics. The number of screws, bolts, pins and clips used may vary depending upon the shaft diameter. With regard to each component of this device, the particular material used to fabricate a particular component may vary depending upon the use to which the device will be put.

In particularly preferred embodiments for shaft diameters of from about 1 to about 8 inches, the outer stationary seal ring preferably is fabricated from carbon or silicon carbide, while the other stationary seal rings preferably are fabricated from resin-impregnated carbon. The rotary seal ring of the device is preferably fabricated from silicon carbide as well. In this way, the stationary seal faces are composed entirely of carbon or silicon carbide materials, thereby producing a minimal amount of friction-generated heat and durable wear surfaces which maintain their original flat surface characteristics, even if abrasives from the material sealed manage to enter space between the seal faces.

As one might expect, the various embodiments of this invention may be fabricated using a variety of dimensions and materials, depending in large part upon the size of a particular shaft and bearing housing aperture with which the device will be used.

The entire disclosure of each and every U.S. patent referred to in this specification is incorporated herein by reference for all purposes. The entire disclosure of each and every foreign patent or patent publication referred to in this specification is incorporated herein by reference for all nonessential purposes.

This invention is susceptible to considerable variation in its practice. Therefore the foregoing description is not intended to limit, and should not be construed as limiting, the invention to the particular forms of the invention described with reference to the Drawings or Examples. Rather, what is intended to be covered is as set forth in the ensuing claims and the equivalents thereof permitted as a matter of law. In the claims, means-plus-function clauses are intended to cover the structures described herein as performing the cited function and not only structural equivalents but also equivalent structures.

I claim:

1. A mechanical seal assembly adapted for sealing the space between an object and a rotatable shaft extending through an aperture in said object, said assembly being split into at least two assembly sections, said seal assembly comprising:

a) at least two split, axially and concentrically aligned stationary seal rings, each having a stationary seal face, an inner surface, and an outer surface;

b) a split rotary seal ring rotatable relative to said stationary seal rings and having a rotary seal face;

c) a split seal housing encasing said seal rings; and d) split elastomeric means between said housing and said outer surfaces, and seal means between said assembly sections, whereby a sealed annular cavity is formed by said housing and said seal rings;

said housing being adapted to admit pressurized fluid into said cavity to create a positive fluid pressure barrier across said seal faces when in sealing contact with each other; and said axially and concentrically aligned stationary seal rings comprising an inner stationary seal ring and an outer stationary seal ring, the area of the axially extending portion of said outer surface of said outer seal ring partially defining said annular cavity being greater than the area of the axially extending portion of said inner surface of said outer seal ring partially defining said annular cavity.

2. A seal assembly in accordance with claim 1 wherein said seal assembly is split substantially diametrically into a pair of said assembly sections.

3. A seal assembly in accordance with claim 1 wherein said elastomeric means comprises at least two O-rings, at least one of said O-rings being annularly disposed around one of said stationary seal rings and at least one of said O-rings being annularly disposed around another of said stationary seal rings, and wherein said seal means comprises a plurality of gaskets sealing said split housing when said assembly sections are urged together.

4. A seal assembly in accordance with claim 1 wherein said outer stationary seal ring is divided into at least two outer stationary seal ring segments, each segment further comprising:
   a) two sealing end surfaces, each sealing end surface being co-engageable with a sealing end surface of another said segment to form an interface between that pair of sealing end surfaces, said outer surface of said outer stationary seal ring forming a radially extending recess traversing said interface, said recess defined in part by a pair of spaced-apart parallel radially extended interior wall faces; and
   b) an aligning clip projecting from one of each pair of said sealing end surfaces and disposed between and engaging said interior wall faces of said recess on one side of said interface and extendable into said recess on the other side of said interface to maintain said sealing end surfaces in detachable co-engagement and alignment with each other.

5. A seal assembly in accordance with claim 1 wherein said housing further comprises (i) a split rotary collar in sealing relation with said rotary seal ring and said shaft, and detachably attached to said shaft to rotate therewith, and (ii) a split stationary gland which encases said seal rings, substantially surrounds said rotary collar, and is detachably attachable to said object.

6. A seal assembly in accordance with claim 1 further comprising a plurality of spacers attached to said housing, annularly disposed on said housing substantially equi-distant from one another, and radially extending from said housing toward said rotatable shaft, said spacers being adapted to maintain said seal assembly in substantially concentric alignment with said rotatable shaft during installation.

7. A seal assembly in accordance with claim 1 further comprising a plurality of retention pins annularly disposed substantially equi-distance from one another and extending into said stationary seal rings on a side opposite said stationary seal faces and into or through said housing, said pins being adapted to prevent rotation of said stationary seal rings under operating conditions.

8. A seal assembly in accordance with claim 1 wherein said housing has at least one inlet aperture extending radially therethrough and into said cavity, and at least one outlet aperture extending radially therethrough and into said cavity, thereby permitting said pressurized fluid to flow into said cavity through said inlet aperture, while also permitting controlled flow of said pressurized fluid out of said cavity through said outlet aperture.

9. A seal assembly in accordance with claim 1 further comprising biasing means positioned within said housing so as to urge and maintain said stationary seal faces in sealing contact with said rotary seal face.

10. A seal assembly in accordance with claim 9 wherein
   i) said assembly is split substantially diametrically into a pair of said assembly sections;
   ii) said elastomeric means comprises at least two O-rings, each of which corresponds to one of said stationary seal rings and is annularly disposed between said outer surface thereof and said housing, and wherein said seal means comprises a plurality of gaskets, each being disposed within a respective split in said split housing, thereby sealing said split housing when said assembly sections are urged together;
   iii) said outer stationary seal ring is divided into at least two outer stationary seal ring segments, each segment further comprising (a) two sealing end surfaces, each sealing end surface being co-engageable with a sealing end surface of another said segment to form an interface between that pair of sealing end surfaces, said outer surface of said outer stationary seal ring forming a radially extending recess traversing said interface, said recess defined in part by a pair of spaced-apart parallel radially extended interior wall faces, and (b) an aligning clip projecting from one of each pair of said sealing end surfaces and disposed between and engaging said interior wall faces of said recess on one side of said interface and extendable into said recess on the other side of said interface to maintain said sealing end surfaces in detachable co-engagement and alignment with each other; and
   iv) said housing further comprises (a) a split rotary collar in sealing relation with said rotary seal ring and said shaft, and detachably attached to said shaft to rotate therewith, and (b) a split stationary gland which encases said seal rings, substantially surrounds said rotary collar, and is detachably attachable to said object.

11. A seal assembly in accordance with claim 10 wherein said housing has at least one inlet aperture extending radially therethrough and into said cavity, and at least one outlet aperture extending radially therethrough and into said cavity, thereby permitting said pressurized fluid to flow into said cavity through said inlet aperture, while also permitting controlled flow of said pressurized fluid out of said cavity through said outlet aperture.

12. A seal assembly in accordance with claim 11 wherein said biasing means comprises a first plurality of coiled springs annularly disposed between said housing and said inner stationary seal ring, and a second plurality of coiled springs annularly disposed between said housing and said outer stationary seal ring.

13. A seal assembly in accordance with claim 12 further comprising a plurality of spacers attached to said housing, annularly disposed on said housing substantially equi-distant from one another, and radially extending from said housing toward said rotatable shaft, said spacers being adapted to maintain said seal assembly in substantially concentric alignment with said rotatable shaft during installation.

14. A seal assembly in accordance with claim 13 further comprising a plurality of retention pins annularly disposed substantially equi-distance from one another and extending into said stationary seal rings on a side opposite said stationary seal faces and into or through said housing, said pins being adapted to prevent rotation of said stationary seal rings under operating conditions.

15. A seal assembly in accordance with claim 10 wherein said biasing means comprises a first plurality of coiled springs annularly disposed between said housing and said inner stationary seal ring, and a second plurality of coiled springs annularly disposed between said housing and said outer stationary seal ring.

16. A seal assembly in accordance with claim 10 further comprising a plurality of spacers attached to said housing, annularly disposed on said housing substantially equi-distant from one another, and radially extending from said housing toward said rotatable shaft, said spacers being adapted to maintain said seal assembly in substantially concentric alignment with said rotatable shaft during installation.

17. A seal assembly in accordance with claim 10 further comprising a plurality of retention pins annularly disposed substantially equi-distance from one another and extending into said stationary seal rings on a side opposite said stationary seal faces and into or through said housing, said pins being adapted to prevent rotation of said stationary seal rings under operating conditions.

18. A method of sealing the annular space between an object and a rotatable shaft extending through an aperture in said object, said method comprising sealably attaching to said object and around said shaft a mechanical seal assembly split into at least two assembly sections, said seal assembly comprising
   a) at least two split, axially and concentrically aligned stationary seal rings, each having a stationary seal face, an inner surface, and an outer surface;
   b) a split rotary seal ring rotatable relative to said stationary seal rings and having a rotary seal face;
   c) a split seal housing encasing said seal rings; and
   d) split elastomeric means between said housing and said outer surfaces, and seal means between said assembly sections, whereby a sealed annular cavity is formed by said housing and said seal rings;
said housing being adapted to admit pressurized fluid into said cavity to create a positive fluid pressure barrier across said seal faces when in sealing contact with each other; and said axially and concentrically aligned stationary seal rings comprising an inner stationary seal ring and an outer stationary seal ring, the area of the axially extending portion of said outer surface of said outer seal ring partially defining said annular cavity being greater than the area of the axially extending portion of said inner surface of said outer seal ring partially defining said annular cavity.

19. A method in accordance with claim 18 wherein said seal assembly is split substantially diametrically into a pair of said assembly sections.

20. A method in accordance with claim 18 wherein said elastomeric means comprises at least two O-rings, each of which corresponds to one of said stationary seal rings and is annularly disposed between said outer surface thereof and said housing, and wherein said seal means comprises a plurality of gaskets, each being disposed within a respective split in said split housing, thereby sealing said split housing when said assembly sections are urged together.

21. A method in accordance with claim 18 wherein said outer stationary seal ring is divided into at least two outer stationary seal ring segments, each segment further comprising:
   a) two sealing end surfaces, each sealing end surface being co-engageable with a sealing end surface of another said segment to form an interface between that pair of sealing end surfaces, said outer surface of said outer stationary seal ring forming a radially extending recess traversing said interface, said recess defined in part by a pair of spaced-apart parallel radially extended interior wall faces; and
   b) an aligning clip projecting from one of each pair of said sealing end surfaces and disposed between and engaging said interior wall faces of said recess on one side of said interface and extendable into said recess on the other side of said interface to maintain said sealing end surfaces in detachable co-engagement and alignment with each other.

22. A method in accordance with claim 18 wherein said housing further comprises (i) a split rotary collar in sealing relation with said rotary seal ring and said shaft, and detachably attached to said shaft to rotate therewith, and (ii) a split stationary gland which encases said seal rings, substantially surrounds said rotary collar, and is detachably attachable to said object.

23. A method in accordance with claim 18 wherein said seal assembly further comprises a plurality of spacers attached to said housing, annularly disposed on said housing substantially equi-distant from one another, and radially extending from said housing toward said rotatable shaft, said spacers being adapted to maintain said seal assembly in substantially concentric alignment with said rotatable shaft during installation.

24. A method in accordance with claim 18 wherein said seal assembly further comprises a plurality of retention pins annularly disposed substantially equi-distance from one another and extending into said stationary seal rings on a side opposite said stationary seal faces and into or through said housing, said pins being adapted to prevent rotation of said stationary seal rings under operating conditions.

25. A method in accordance with claim 18 wherein said housing has at least one inlet aperture extending radially therethrough and into said cavity, and at least one outlet aperture extending radially therethrough and into said cavity, thereby permitting said pressurized fluid to flow into said cavity through said inlet aperture, while also permitting controlled flow of said pressurized fluid out of said cavity through said outlet aperture.

26. A method in accordance with claim 18 wherein said seal assembly further comprises biasing means positioned within said housing so as to urge and maintain said stationary seal faces in sealing contact with said rotary seal face.

27. A method in accordance with claim 26 wherein
   i) said seal assembly is split substantially diametrically into a pair of said assembly sections;
   ii) said elastomeric means comprises at least two O-rings, each of which corresponds to one of said stationary seal rings and is annularly disposed between said outer surface thereof and said housing, and wherein said seal means comprises a plurality of gaskets, each being disposed within a respective split in said split housing, thereby sealing said split housing when said assembly sections are urged together;
   iii) said outer stationary seal ring is divided into at least two outer stationary seal ring segments, each segment further comprising (a) two sealing end surfaces, each sealing end surface being co-engageable with a sealing end surface of another said segment to form an interface between that pair of sealing end surfaces, said outer surface of said outer stationary seal ring forming a radially extending recess traversing said interface, said recess defined in part by a pair of spaced-apart parallel radially extended interior wall faces, and (b) an aligning clip projecting from one of each pair of said sealing end surfaces and disposed between and engaging said interior wall faces of said recess on one side of said interface and extendable into said recess on the other side of said interface to maintain said sealing end surfaces in detachable co-engagement and alignment with each other; and
   iv) said housing further comprises (a) a split rotary collar in sealing relation with said rotary seal ring and said shaft, and detachably attached to said shaft to rotate therewith, and (b) a split stationary gland which encases said seal rings, substantially surrounds said rotary collar, and is detachably attachable to said object.

28. A method in accordance with claim 27 wherein said housing has at least one inlet aperture extending radially therethrough and into said cavity, and at least one outlet aperture extending radially therethrough and into said cavity, thereby permitting said pressurized fluid to flow into said cavity through said inlet aperture, while also permitting controlled flow of said pressurized fluid out of said cavity through said outlet aperture.

29. A method in accordance with claim 28 wherein said biasing means comprises a first plurality of coiled springs annularly disposed between said housing and said inner stationary seal ring, and a second plurality of coiled springs annularly disposed between said housing and said outer stationary seal ring.

30. A method in accordance with claim 29 wherein said seal assembly further comprises a plurality of spacers attached to said housing, annularly disposed on said housing substantially equi-distant from one another, and radially extending from said housing toward said rotatable shaft, said spacers being adapted to maintain said seal assembly in substantially concentric alignment with said rotatable shaft during installation.

31. A method in accordance with claim 30 wherein said seal assembly further comprises a plurality of retention pins annularly disposed substantially equi-distance from one another and extending into said stationary seal rings on a side opposite said stationary seal faces and into or through said housing, said pins being adapted to prevent rotation of said stationary seal rings under operating conditions.

32. A method in accordance with claim 27 wherein said biasing means comprises a first plurality of coiled springs annularly disposed between said housing and said inner stationary seal ring, and a second plurality of coiled springs annularly disposed between said housing and said outer stationary seal ring.

33. A method in accordance with claim 27 wherein said seal assembly further comprises a plurality of spacers attached to said housing, annularly disposed on said housing substantially equi-distant from one another, and radially extending from said housing toward said rotatable shaft, said spacers being adapted to maintain said seal assembly in substantially concentric alignment with said rotatable shaft during installation.

34. A method in accordance with claim 27 wherein said seal assembly further comprises a plurality of retention pins annularly disposed substantially equi-distance from one another and extending into said stationary seal rings on a side opposite said stationary seal faces and into or through said housing, said pins being adapted to prevent rotation of said stationary seal rings under operating conditions.

35. A mechanical seal assembly adapted for sealing the space between an object and a rotatable shaft extending through an aperture in said object, said seal assembly comprising:

a) at least four arcuate stationary seal ring segments which, when assembled, form at least two axially and concentrically aligned stationary seal rings, each having a stationary seal face, an inner surface, and an outer surface;

b) at least two arcuate rotary seal ring segments which, when assembled, form a rotary seal ring rotatable relative to said stationary seal rings and having a rotary seal face;

c) at least four seal housing segments which, when assembled, form a seal housing encasing said seal rings; and d) elastomeric means disposed between said housing and said outer surfaces when assembled, and sealing means disposed between said housing segments when assembled, whereby a sealed annular cavity is formed by said housing and said seal rings;

said housing being adapted to admit pressurized fluid into said cavity to create a positive fluid pressure barrier across said seal faces when in sealing contact with each other; and said axially and concentrically aligned stationary seal rings comprising an inner stationary seal ring and an outer stationary seal ring, the area of the axially extending portion of said outer surface of said outer seal ring partially defining said annular cavity being greater than the area of the axially extending portion of said inner surface of said outer seal ring partially defining said annular cavity.

* * * * *